United States Patent [19]

Collet

[11] 4,253,509

[45] Mar. 3, 1981

[54] THEFT DETERRENT LOCKING NUT

[76] Inventor: James R. Collet, 315 Lynn Dr., Lafayette, La. 70518

[21] Appl. No.: 27,658

[22] Filed: Apr. 6, 1979

[51] Int. Cl.³ .............................................. F16B 39/00
[52] U.S. Cl. ................................... 411/214; 411/339; 411/373; 411/397; 411/383; 411/910
[58] Field of Search ................ 85/1 RK, 1.5 R, 4, 32; 151/27, 28; 70/229, 230

[56] References Cited

U.S. PATENT DOCUMENTS

| 502,827 | 8/1893 | Nixon | 85/1.5 R |
| 1,194,792 | 8/1916 | Stewart | 85/32 R |
| 1,667,305 | 4/1928 | Bowman | 151/27 |

*Primary Examiner*—Casmir A. Nunberg

[57] ABSTRACT

A theft deterrent device for "bolting" pieces of material together, comprising:

(1) a nut-like device having a smooth outer surface resistant to the effects of conventional wrenches,
(2) a male threaded member having an internally threaded axial bore, adapted to threadedly engage the nut-like member,
(3) a locking screw for threadedly engaging the internal bore of the male member, and having a head that mates with the smooth outer surface of the nut-like device, resulting in an essentially smooth, continuous outer surface resistant to removal using conventional wrenches, and
(4) an environmental plug for inserting into the driving recess or bore of the screw to prevent foreign and corrosive matter from entering the recess. The locking screw threads are of opposite hand to that of the nut-like portion, so that the locking screw must first be removed before the nut may be removed. With the locking screw in place, the driving recess of the nut is inaccessible, the locking screw head having conformed to the configuration of the nut to form an essentially uniform, smooth and continuous outer surface which is virtually resistant to the effects of conventional wrenches.

11 Claims, 6 Drawing Figures

THEFT DETERRENT LOCKING NUT

BACKGROUND OF THE INVENTION

A common problem facing producers of oil and gas from producing wells is that of theft of oil and gas field valves and equipment from wellheads located in remote and unguarded areas. In a matter of minutes, a thief using conventional adjustable wrenches can unbolt a wellhead christmas tree and remove it from the wellhead casing flange. Considering, not only the cost of the christmas tree, but also the loss of oil or gas production, the oil or gas waste and the man-time required to install another christmas tree, the theft of a christmas from a producing oil or gas well is extremely costly.

Accordingly, it is an object of the present invention to provide a device that will deter any would-be thief and greatly reduce the theft of oil field valves and equipment from remote and unguarded locations.

It is another object of the present invention to provide a nut-like locking device which is easily installed and difficult to remove, once installed.

It is a further object of the present invention to provide a nut-like locking device that is sealed from the detrimental effects of the environment.

SUMMARY OF THE INVENTION

In accordance with the present invention, a nut-type locking device is disclosed, comprising:

(1) a nut having a smooth outer surface, an internal bore threaded along a lower portion thereof, a first pocket for receiving a driving mechanism within the upper portion of the bore and a recess within a top portion of the nut for receiving the head of a locking screw;

(2) a bolt or shaft, having external threads for engaging the threads of the nut and a threaded internal bore along the axis thereof for receiving the shaft of a locking screw;

(3) a locking screw having a threaded shaft for engaging the internal bore of the first bolt or shaft and having a screwhead that mates into the recess within the nut upper portion and having an internal bore having a means therein permitting the locking screw to threadedly engage the shaft internal bore; and (4) a plug for inserting into the locking screw internal bore to prevent foreign and corrosive material from entering the bore.

The nuts may be used with a conventional bolt having a threaded intrnal bore along the axis thereof, or may be used with a male threaded member, each end thereof having an appropriately threaded internal bore, in which event a locking nut and locking screw is used on each end thereof.

BRIEF DESCRIPTION OF THE DRAWINGS

Other objects and advantages of the invention will become apparent upon a reading of the following detailed description and upon reference to the drawings, in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 6:
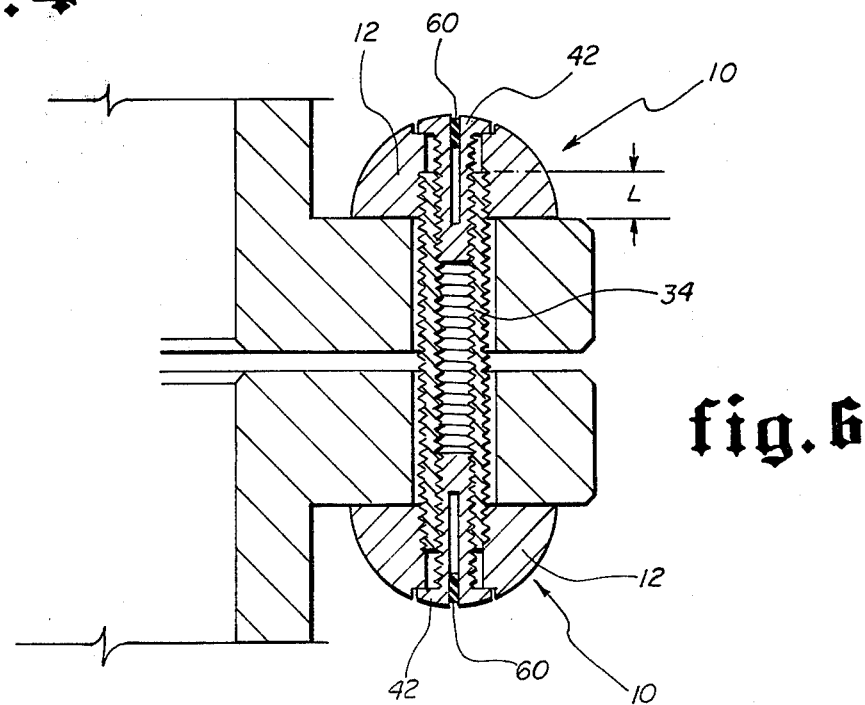
FIG. 6 is a vertical sectional view of the assembled components of the present invention shown in operation to attach two mating flanges to each other.

Turning now to the drawings, a nut-type locking device of the present invention is shown in FIG. 6 generally illustrated by the numeral 10. The device 10 comprises a nut 12 having a smooth outer surface, shown in FIG. 1, a bolt or shaft 34, shown in partial section in FIG. 3, and a locking screw 42, shown in partial section in FIG. 4.

Figure 1:
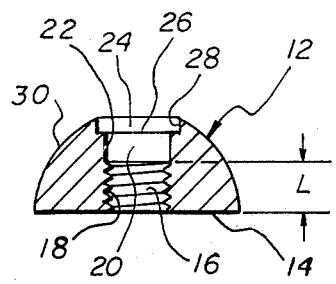
FIG. 1 is a vertical sectional view of the nut portion of the present invention.
Figure 2:
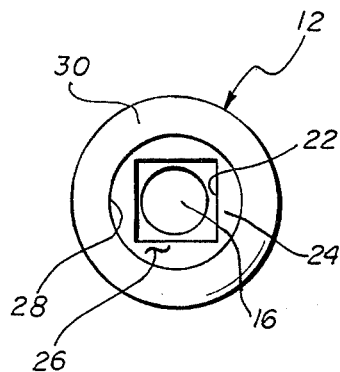
FIG. 2 is a top view of the nut portion of the present invention as shown in FIG. 1.

As best shown in FIG. 1, the preferred embodiment of the smooth surface nut 12 is of a semi-spherical configuration having an essentially flat lower surface 14 for butting against the backface of a flange or other metal surface or against a lock washer or other device for preventing the nut from being jarred loose by vibration. The nut 12 has an internal bore 16 defining an axis through the geometric center thereof. As shown in the drawing, a lower portion of this bore contains threads 18 similar to the threads of a typical machine nut for engaging mating threads of a bolt or threaded shaft. A first pocket 20 is located along this central axis of the nut 12 and at the top portion of the internal bore 16. An installation device may be inserted into this pocket 20 to turn the nut into engagement with a bolt shaft or male threaded member. This first pocket 20 has a polygonal cross-section and comprises a plurality of surfaces 22 which engage mating driving surfaces of the installation device in order that the device may apply torque to the nut 12 by engaging the surfaces 22.

As best shown in FIG. 1, the smooth surface nut 12 also includes a recess 24 in the top portion thereof, such recess defined by a first surface 26 perpendicular to the central axis of rotation of the nut 12, and a cylindrical vertical surface 28 concentric with the vertical axis of rotation of the nut 12. The preferred embodiment of the nut 12 includes an outer surface 30 of semi-spherical configuration which precludes the nut's being gripped by a pipe wrench or other conventional wrench. It is intended that the nut recess 24 receive the head of a locking screw 42 which, when in position, will complete the outer semi-spherical surface 30 of the nut.

Figure 3:
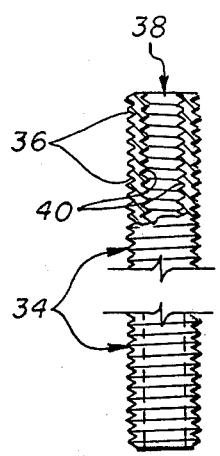
FIG. 3 is a partial vertical sectional view of the male threaded member of the present invention.
Figure 4:
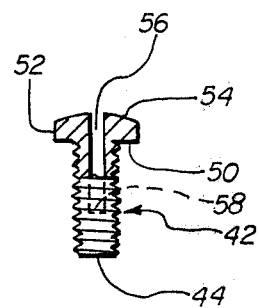
FIG. 4 is a partial vertical sectional view of the locking screw portion of the present invention.
Figure 5:
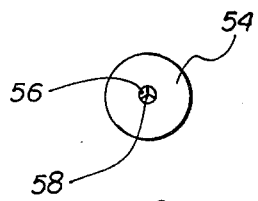
FIG. 5 is a top view of the locking screw portion of the present invention as shown in FIG. 4.

As best shown in FIG. 3, the bolt or shaft 34 includes external thread 36 for mating with the internal threads 18 of the smooth surface nut 12 so that be engaging threads 36 with threads 18 and rotating the nut 12 about its central axis, the nut is threadedly secured to the male threaded member 34.

The male member 34 includes an internal bore 38, which bore contains internal threads 40 for engaging a threaded shaft 44 of the locking screw 42. In the preferred embodiment, these internal threads 40 and mating locking screw threads 46 are of opposite hand to the nut internal threads 18 and shaft external threads 36. By so orienting the threads 40 and 36, the locking screw 42 and nut 12 must be turned in opposite directions to be removed. It is therefore impossible to remove both nut and locking screw simultaneously by turning both in the same direction.

As described hereinabove, the locking screw 42 includes a screwhead 48 of a configuraton to mate into the nut recess 24 when screwed into place, as intended. The screwhead 48 includes an undersurface 50 which mates with the surface 26 of the nut 12, and a vertical cylindrical edge surface 52 concentric with the axis of rotation of the screw shaft 44, which edge surface engages the vertical cylindrical surface 28 of the nut 12. The screwhead upper surface 54 completes the outer semi-spherical surface 30 of the preferred embodiment when the locking screw 42 is in its locking position as shown in FIG. 6.

The locking screw 42 includes an internal bore 56, which bore terminates in a slot pattern or second pocket 58. In the preferred embodiment this slot pattern is of a "crow's foot" design, i.e. these radial slots mutually 120° apart, to enable the locking screw 42 to be inserted and tightened into place by a "crow's foot" screwdriver. Obviously, a different pattern may be used to render it all but impossible to remove the locking screw by any means other than a screwdriver or driving tool having a mating pattern.

The preferred embodiment of the present invention also includes a plug 60 of rubber, plastic or similar material, which is inserted into the bore 56 of the locking screw 42 once the screw is in place to prohibit moisture and foreign matter from entering and corroding the internal bore or slot pattern 58 therein.

To install the nut-type locking device 10, the male threaded member 34 (or a similar bolt having an internally threaded bore therein) is installed through mating holes in mating flanges or other pieces of material to be bolted together. This male member 34 extends from the surface of the flange a sufficient distance to allow engagement with a full thread of the nut 12, in accordance with API standard, i. e. one complete revolution of the nut following initial engagement of the mating threads. It is to be noted that the male member 34 should not extend from the flange surface a distance greater than L, the length of the threaded portion of the nut internal bore 16, as shown in FIGS. 1 and 6.

With the male member 34 extending from the flange suface a sufficient distance, the smooth surface nut 12 is theadedly engaged thereto and tightened down by means of a suitable installation device which mates into the polygonal first pocket 20 and engages the multiple surfaces 22 for rotating the nut 12 about its central axis.

When the smooth surface nut 12 is tightened into position on the flange, the installation device is retracted and locking screw 42 is inserted into the threaded bore 38 and screwed down into position using a "crow's foot" or other appropriate type of screwdriver. With the locking screw 42 securely in place, the screwdriver is removed and a suitable plug 60 is inserted into the screw bore 56 to prevent moisture and other foreign matter from entering and corroding the internal slot pattern 58. In the preferred embodiment, this plug 60 is constructed of plastic and, when press-fitted into the screw internal bore 56, the outer surface thereof completes the semi-spherical configuration of the combined smooth surface nut 12 and locking screw 42.

To install nuts 12 on each end of a male member 34, as in FIG. 6, a nut is first screwed onto one end of the member to form a bolt-like device which is then inserted through the flange mating holes, as in installing any conventional bolt. Next, a second nut 12 would be installed on the opposite end of the member 34, and tightened down to the flange face using a nut installation device on each of the nuts 12, simultaneously. With the nut-shaft-nut arrangement secured to the flange faces, locking screws 42 and plugs 60 are installed following the procedure outline hereinabove.

The preferred embodiment incorporates shaft external threads 36 and internal threads 40 oriented in opposite direction to one another. It is readily apparent that with this combination of reverse-direction threads, in the unlikely event a would be thief is able to get a "bite" on the locking device with a pipewrench or similar tool, it would be impossible to remove the nut 12 by simply turning the nut in a direction opposite to the direction in which it was installed. As long as the locking screw 42 is in position as shown in FIG. 6, the nut 12 cannot be removed from the male member 34, and any attempt to do so would simply cause the locking screw to tighten against the nut to prevent the nut from being removed from the male member.

The present inventon has been described as being used on flanges of various pieces of equipment used on a wellhead; obviously, the present invention has any number of applications, and it is not intended that the locking device be limited to the application as described herein.

The invention having been described, what is claimed is:

1. A theft deterrent nut-type device for securing a plurality of pieces of material together, said device being resistant to removal using conventional wrenches, so as to deter a potential thief from removing said device, comprising:
    (a) a nut having:
        (1) a lower surface
        (2) an internal bore perpendicular to said lower surface, said bore being internally threaded along a lower portion thereof,
        (3) a smooth upper surface having a circular cross-section perpendicular to said bore, said upper surface terminating at the periphery of said lower surface, thereby prohibiting a typical wrench from effecting a grip upon said nut to prevent removal thereof, and
        (4) a first pocket having a polygonal cross-section centered along the axis of said bore forming multiple driver engaging surfaces within an upper portion of said bore for receiving an installation device having an identical cross-section for rotating said nut about said axis;
    (b) a male threaded member having:
        (1) external threads adapted to engage said internal threads of said nut, and
        (2) an internal bore along the axis thereof, said bore having internal threads of less pitch than that of said male member external threads, for receiving the threaded shaft of a locking screw; and
    (c) a locking screw having:
        (1) an externally threaded shaft for threadedly engaging said internal bore of said male member,
        (2) a head having a smooth upper surface having a circular cross-section perpendicular to said shaft, and having a configuration so as to essentially conform to the configuration of said nut upper surface, thereby prohibiting a typical wrench from effecting a grip upon said screw head to prevent removal thereof, and (3) an internal bore through said screw head along the axis of said shaft, terminating in a second pocket for receiving an installation device for rotating said locking screw about its axis.

2. The device as set forth in claim 1, wherein said nut includes a recess within the uppermost portion thereof for receiving the head of said locking screw.

3. The device as set forth in claim 2, including a plug for inserting into said locking screw bore to prohibit moisture and other foreign matter from entering said bore.

4. The device as set forth in claim 2, wherein said nut upper surface is of a semi-spherical configuration.

5. The device as set forth in claim 3, wherein said nut upper surface is of a semi-spherical configuration.

6. The device as set forth in claim 1, wherein said male threaded member internal threads are of opposite hand to that of said male member external threads.

7. The device as set forth in claim 6, wherein said nut includes a recess within the uppermost portion thereof for receiving the head of said locking screw.

8. The device as set forth in claim 7, including a plug for inserting into said locking screw bore to prohibit moisture and other foreign matter from entering said bore.

9. A nut-type device for securing a plurality of pieces of material together, said device being resistant to removal using conventional wrenches, so as to deter a potential thief from removing said device, comprising:

(a) a semi-spherically shaped nut having:
  (1) a flat lower surface,
  (2) an internal bore perpendicular to said lower surface, said bore being internally threaded along a lower portion thereof and adapted to threadedly engage a male threaded member,
  (3) a pocket having a polygonal cross-section centered along the axis of said bore forming multiple driver engaging surfaces within an upper portion of said bore for receiving an installation device having an identical cross-section for rotating said nut about said axis, and
  (4) a recess within the uppermost portion thereof for receiving the head of a locking screw;

(b) a male threaded member having:
  (1) external threads adapted to engage said internal threads of said nut, and
  (2) an internal bore along the axis thereof, said bore having internal threads of opposite hand to that of said male member external threads, for receiving the threaded shaft of a locking screw;

(c) a locking screw adapted to engage said male threaded member, having:
  (1) a threaded shaft for threadedly engaging said internal bore of said male member,
  (2) a screw head having a configuration to complete the nut semi-spherical configuration when mated into said nut recess, and
  (3) an internal bore through said screw head along the axis of said shaft, said bore terminating in a slot pattern adapted to receive an installation device for rotating said locking screw about its axis; and (d) a plug adapted to be inserted into said locking screw bore to prohibit moisture and other foreign matter from entering said bore.

10. A theft deterrent kit having component parts capable of being assembled for securing a plurality of pieces of material together and, as assembled, said parts being resistant to removal using conventional wrenches, so as to deter a potential thief from removing said parts, the kit comprising the combination of:

(a) a semi-spherically shaped nut having:
  (1) a flat lower surface,
  (2) an internal bore perpendicular to said lower surface, said bore being internally threaded along a lower portion thereof and adapted to threadedly engage a male threaded member,
  (3) a pocket having a polygonal cross-section centered along the axis of said bore forming multiple driver engaging surfaces within an upper portion of said bore for receiving an installation device having an identical cross-section for rotating sid nut about said axis, and
  (4) a recess within the uppermost portion thereof for receiving the head of a locking screw;

(b) a male threaded member having:
  (1) external threads adapted to engage said internal threads of said nut, and
  (2) an internal bore along the axis thereof, said bore having internal threads of opposite hand to that of said male member external threads, for receiving the threaded shaft of a locking screw;

(c) a locking screw adapted to engage said male threaded member, having:
  (1) a threaded shaft for threadedly engaging said internal bore of said male member,
  (2) a screw head having a configuration to complete the nut semi-spherical configuration when mated into said nut recess, and
  (3) an internal bore through said screw head along the axis of said shaft, said bore terminating in a slot pattern adapted to receive an installation device for rotating said locking screw about its axis; and (d) a plug adapted to be inserted into said locking screw bore to prohibit moisture and other foreign matter from entering said bore.

11. A method of deterring a potential thief from tampering with a bolt and nut connection comprising the steps of:

(1) providing at least one internally threaded nut having a smooth outer surface and an internal polygonal shaped pocket for receiving an installation device, (2) installing said nut on a male threaded member having an internally threaded axial bore, (3) threadedly installing a locking screw having an internal bore terminating in a means for receiving an installation device, into said internally threaded male member to prevent the nut from being removed from said male member, and (4) installing an environmental plug into said locking screw internal bore to prohibit moisture and other foreign matter from entering said bore.

* * * * *